United States Patent [19]

Nose et al.

[11] 3,926,905
[45] Dec. 16, 1975

[54] FLAME RETARDANT HARDENABLE COMPOSITION OF WATER GLASS AND DECORATIVE PRODUCTS MADE BY USING THE SAME

[75] Inventors: Shinji Nose, Kobe; Shingo Tokuda, Nishinomiya; Motomu Tanaka, Kobe; Hideaki Tsujimura, Takatsuki, all of Japan

[73] Assignee: Osaka Soda Co., Ltd., Osaka, Japan

[22] Filed: June 7, 1974

[21] Appl. No.: 477,459

[30] Foreign Application Priority Data
June 13, 1973 Japan................................ 48-66688
July 13, 1973 Japan................................ 48-79563

[52] U.S. Cl. .............. 260/42.43; 106/83; 106/287 S
[51] Int. Cl.² ............................................. C08K 3/34
[58] Field of Search . 260/42.43, 78.4 UA, 78.5 UA; 106/287 S, 15 FP, 83

[56] References Cited
UNITED STATES PATENTS
1,830,906   11/1931   Jaeger.............................. 106/83 X

*Primary Examiner*—Lewis T. Jacobs
*Attorney, Agent, or Firm*—Sherman & Shalloway

[57] ABSTRACT

A flame retardant hardenable composition comprising water glass and a hardener therefor, said composition being incorporated with a resin consisting of a diallyl phthalate polymers of at least 40% by weight of a diallyl phthalate and not more than 60% by weight of co-monomers copolymerizable therewith, said resin being incorporated in the composition in an amount of 5–50% based on the total weight of the solids content of said water glass and said resin, and a flame retardant decorative product made essentially of a solid substrate and aforesaid composition.

7 Claims, No Drawings

FLAME RETARDANT HARDENABLE COMPOSITION OF WATER GLASS AND DECORATIVE PRODUCTS MADE BY USING THE SAME

This invention relates to the known hardenable compositions of water glass, i.e., compositions containing water glass and its hardener. More particularly, the invention relates to improvements in these compositions wherein the lack of impact strength and flexural resistance, the fatal defects of these compositions, have been effectively surmounted without sacrificing the desirable properties such as flame retardancy, heat resistance, resistance to solvents, weatherability and hardness that are possessed by these compositions, as well as wherein the printing of beautiful ornamental patterns on the surface formed by these compositions has been made possible. The invention also relates to decorative products made by the use of such compositions as well as a method of producing the same.

The flame retardant hardenable composition of water glass obtained by adding, as required, an additive such as a pigment to water glass and then adding a hardener of water glass such for example, as sodium silicofluoride, phosphoric acid, aluminum phosphate, polyaluminum phosphate and zinc dust is known. The hardened products of such a composition possess, in addition to flame retardancy, the various desirable properties such as indicated hereinbefore. Hence, they are used in such fields as acid-proof cement, molds, adhesives, coating materials, etc.

However, the conventional compositions obtained from such a hardened composition possessed hardly any resistance to shocks and flexing. Hence, there was imposed a serious limitation to their use. Further, while it was possible in the case of the conventional composition consisting of water glass, a hardener therefor and a pigment to execute a monochromatic decoration, a decoration having a complicated design and coloring could not be executed as a practical matter.

In consequence our research was with a view to providing an improved composition in which the lack of impact strength and flexural resistance of the conventional hardenable composition of water glass has been surmounted and also in which the execution of decorations having complicated designs and coloring has been made possible. It has been discovered that the diallyl phthalate polymer or copolymer, and preferably a finely divided form thereof, e.g., the diallyl phthalate emulsion polymerization or emulsion copolymerization liquid, could form a homogeneous and stable composition with water glass. We also discovered that this composition becomes a homogeneous hardened composition without losing its homogeneous state even when its emulsion medium disappears on hardening by drying. We further found that the lack of impact strength and flexural resistance of the conventional compositions could be effectively improved. When considered from the fact that when imparting flexibility to the composition, say, an emulsion polymerization liquid of such as methyl acrylate or vinyl acetate, or a rubber latex is incorporated in the water glass, the formation of aggregates or phase separation would occur to make it impossible to obtain a homogeneous and stable composition, and further that even though such a composition is coated immediately after its mixing and hardened by drying, a homogeneous, dried hardened product could not be obtained; it is indeed surprising that excellent compatibility is demonstrated between the dially phthalate resin and water glass in the case of the hardenable composition containing the aforesaid diallyl phthalate polymer or copolymer, water glass and a hardener as well as in the case of the hardened composition resulting from hardening said hardenable composition and, in addition, that excellent and improved properties are imparted in the latter case.

Further, while in the case of an emulsion, say, in which the content of diallyl phthalate in the copolymer has been made at least 20% by weight and the polymerization has been carried out to such an extent that substantially no double bonds of the monomers contained in the system remain, the emulsion as such does not possess coating formability, it was found that a mixture of this emulsion polymerization liquid and water glass demonstrates excellent coating formability. Again, it was found that since the diallyl phthalate copolymer contained in the emulsion is contained in the form of insolubilized and infusibilized fine gel particles, in the case of the hardened product obtained by adding water glass to this copolymer in an amount of more than 50% by weight (calculated on the basis of the solids components of both), the good properties of a hardened water glass product such as heat resistance, weatherability, and resistance to solvents were not impaired at all.

Further, it was discovered that when a substrate was coated or impregnated with the hardenable composition of water glass containing the diallyl phthalate polymer or copolymer of this invention, and then after, say, predrying, applying a pattern and coloring by means of such as printing or decalcomania and dried, it was possible to obtain hardened composition having a complicated decoration that was not hitherto obtainable.

It is therefore an object of this invention to surmount effectively the lack of impact strength and flexural resistance of the conventional hardenable composition of water glass without losing its desirable properties and furthermore to provide a flame retardant hardenable composition of water glass that can provide decorative products having a unique decorative value not obtainable in the case of the conventional composition as well as the decorative products made by the use of this composition.

Other objects and advantages of the present invention will become more apparent from the following description.

The water glass used in the present invention is well known and is readily available commercially. It usually has the molecular composition $M_2O \cdot nSiO_2$, where M is either sodium, potassium or lithium and $n$ is 1–9, of which the water-soluble sodium silicate having the composition $Na_2O \cdot nSiO_2$, where $n = 2 - 4$, is used with preference. Several classes of these water glasses may be used combined as a mixture depending upon the end desired. At times, it is also possible to conjointly use the quaternary ammonium silicates.

The diallyl phthalate resin incorporated in the invention composition comprises a polymer of at least 40 weight %, and preferably at least 50 weight %, of diallyl phthalate and not more than 60 weight %, and preferably not more than 50 weight %, of other comonomers copolymerizable with the former. When a comonomer is to be used, it is usually used in an amount of preferably about 10% by weight or more. The foregoing polymer may not only be used singly but also in combinations of two or more classes. The term "diallyl phthalate polymer", as here used, refers to the polymers of diallyl orthophthalate, diallyl isophthalate or diallyl terephthalate. On the other hand, as the other comonomers copolymerizable with these diallyl phthalates, preferred are the vinyl monomers or allyl monomers that are readily copolymerizable with the diallyl phthalates.

As specific examples of these comonomers, mention can be made of acrylic acid or methacrylic acid; the $C_1$–$C_8$ alkyl esters such as methyl, ethyl, propyl, isopropyl, butyl, secondary butyl, tertiary butyl, 2-ethylhexyl and octyl or the allyl, glycidyl, 2-hydroxyethyl, phenyl and benzyl esters of acrylic acid or methacrylic acid; the allyl esters of cyanuric or isocyanuric acid; the vinyl or allyl esters of the $C_1$–$C_{18}$ aliphatic monocarboxylic acids such as acetic acid, propionic acid and stearic acid; the vinyl or allyl esters of the $C_2$–$C_{10}$ aliphatic dicarboxylic acids such as oxalic acid, adipic acid and sebacic acid; the allyl esters of the aromatic carboxylic acids such as benzoic acid, trimellitic acid, pyromellitic acid and naphthalenedicarboxylic acid; the $C_1$–$C_8$ alkyl esters or allyl esters such as methyl, butyl and octyl esters of the $C_4$–$C_8$ unsaturated dicarboxylic acids; the allyl esters of chlorendic acid and tetrahydrophthalic acid; allyl glycidyl ether; the allyl ethers of the $C_2$–$C_{10}$ aliphatic polyhydric alcohols such as glycerine and trimethylolpropane; diethylene glycol bis(allyl carbonate); acrylonitrile; acrylamide; styrene; divinylbenzene; vinyl chloride; vinylidene chloride; the $C_2$–$C_6$ olefins such as ethylene, propylene, isobutylene and 4-methylpentene-1; tetraethylene glycol dimethacrylate; and N-vinylpyrrolidone.

The choice of these comonomers will vary depending upon the polymerization method and the intended properties. For instance, in the case where a finely divided diallyl phthalate polymer is to be made, the allyl type monomers or an alkyl ester of acrylic acid is to be preferred.

In the case of a diallyl phthalate type resin obtained by known polymerization methods other than emulsion polymerization, such a resin is usually added to the composition of this invention after it has been rendered into a fine powder by the use of mechanical comminution means. In this case, the resin is comminuted to a particle size of less than 50 microns, and preferably less than 10 microns, and the more finely the resin is subdivided, the greater is the surface condition as well as such properties as flexibility of the resulting product.

In the composition of the present invention, since it is especially preferred that these diallyl phthalate resins be homogeneously dispersed in the composition in a finely divided state, this resin is preferably a resinous liquid of a polymerization or copolymerization reaction product formed by the emulsion polymerization or emulsion copolymerization reaction, or a fine powder obtained by removing the emulsifying medium from the foregoing liquid. The resin formed by such an emulsion polymerization or copolymerization reaction is in finely divided form of usually of a particle size, not greater than 5 microns. For facilitating the operation of homogeneously mixing the resin with the water glass, it is preferred to use the aforementioned emulsion polymerization or copolymerization product liquid or, if desired, the foregoing product liquid after the amount of the liquid has been adjusted by dilution or concentration.

The method of polymerizing diallyl phthalates is per se well known. Hence, to avoid redundancy, it will be briefly described taking, for example, the case of emulsion polymerization.

The emulsion polymerization is carried out in the following manner: i.e., by carrying out the polymerization reaction of an aqueous emulsion dispersion system containing a surfactant and a diallyl phthalate type monomer or a monomer and a comonomer in the presence of a water-soluble radical initiator such, for example, as ammonium persulfate, sodium persulfate, potassium persulfate, hydrogen peroxide, t-butyl hydroperoxide and cumene hydroperoxide with stirring. It is also possible to use the redox catalyst system in conjunction with the use of a reducing agent. The addition of a trace amount of inhibitors and retarders can also be made. The initiator can be used in an amount ranging between 0.05 and 10.0 % by weight based on the total monomer content. Of the foregoing initiators, most frequently used are the persulfates, which are used in an amount of usually 0.1–2.0 % by weight based on the monomers.

Examples of the foreing surfactant include the nonionic polyoxyethylene alkyl ethers, polyoxyethylene alkyl phenyl ethers and polyoxyethylene alkyl esters; or the anionic alkali salts of the $C_{12}$–$C_{18}$ higher fatty acids; the alkali salts of the sulfuric esters of the $C_{12}$–$C_{18}$ higher aliphatic alcohols, and likewise of the phosphoric esters thereof and the alkali salts thereof; the alkali salts of the alkylarylsulfonic acids; and the alkali salts of the naphthalenesulfonic acid condensed with formalin. The surfactants that are particularly suitable for use in this invention are phosphoric acid esters of polyoxyethylene alkylphenyl ether, phosphoric acid esters of bis(polyoxyethylene alkylphenyl ether) and the alkali salts thereof, or sulfuric acid esters of polyoxyethylene alkylphenyl ether and the alkali salts thereof.

These surfactants are suitably used in an amount ranging from 1 to 10 % by weight based on the total monomers.

Further, the conjoint use of a protective colloid type emulsifier such as polyvinyl alcohol or the cellulose derivatives may also be made.

The amount of monomer usually added is preferably on the order of 20–50 % by weight based on the water, and the reaction is usually carried out at a temperature of about 40°–95°C. When the polymerization reaction proceeds too rapidly, the polymerization is best carried out while adding the monomer continuously. This polymerization reaction is preferably carried out until the substantial disappearance of any unreacted monomer.

In the case of the composition of the invention, the aforementioned diallyl phthalate polymer can be suitably chosen and used in accordance with the intended use of the final product. For instance, when it is desired to obtain a harder hardened composition, preferably used is a diallyl phthalate-rich polymer (e.g. above about 90 weight %). On the other hand, when it is desired to impart a higher degree of flexibility to said composition, preferred is the use of the diallyl phthalate copolymer, and especially that in which the comonomer content is above about 10 % by weight.

The invention composition contains, in addition to the aforesaid water glass and diallyl phthalate resin, a hardener for the water glass, which hardener is suitably chosen from the various known hardeners. As this hardener, that which is substantially insoluble in water at room temperature is desirable. Examples of such a hardener are the metal phosphates such as zinc phosphate, aluminum tertiary phosphate, calcium phosphate, iron phosphate, magnesium phosphate and lead phosphate; the condensed metal phosphates obtained by mixing phosphoric acid with either an oxide or hydroxide of a metal such as iron, lead, zinc, magnesium or aluminum in a molar ratio of 1:3 to 3:1 and calcining the mixture at an elevated temperatures above 200°C.; and the alkali metal or alkaline earth metal (sodium, potassium, calcium and barium) salts of hexafluorosilicic acid. At times, it is also possible to use the water-soluble ammonium phosphate, sodium ammonium hydrogen phosphate, diammonium hydrogen phosphate, magnesium hydrogen phosphate, primary aluminum phosphate, zinc hexafluorosilicate, lead (II) hexafluorosilicate, magnesium hexafluorosilicate, ammonium hexafluorosilicate, boric acid, sodium borate and phosphoric acid. In addition, the conjoint use of metallic zinc, zinc hydroxide, calcium hydroxide, aluminum hydroxide, zinc oxide, magnesium oxide, or the organic acids and their amides and imides can be made. Again, the aforementioned phosphates and hexafluorosilicates may also be used after modification with an alkali silicate. Of these, most preferred is the use of condensed aluminum phosphate obtained by calcining aluminum phosphate of a molar ratio of $P_2O_5:Al_2O_3 = 1:1-3:1$ at a temperature of 400°–1000°C. in the final stages until the weight becomes constant.

These hardeners are preferably comminuted to a fine a state as possible, the hardeners being used at usually a size of less than 50 microns, and preferably less than 30 microns. While the amount in which these hardeners are added can be suitably chosen depending upon the classes of the hardener and water glass used, they are usually added in an amount on the order of 10–100 % by weight based on the solids content of the water glass. For instance, when the JIS No. 3 sodium silicate whose $Na_2O:SiO_2$ molar ratio is 1:3 and solids content is 40 weight % is used as the water glass and condensed aluminum phosphate whose $P_2O_5:Al_2O_3$ molar ratio is 2.5:1 is used as the hardener, the addition of 10–16 parts by weight of the hardener per 100 parts by weight of the water glass will do.

When the hardener is used in excess, not only the pot life becomes short, but also the appearance of the surface of the resulting hardened product is impaired at times by the remaining hardener. Hence, it is best not to use the hardener in an unjustifiably excess amount. On the other hand, when an unsufficient amount of the hardener is used, such physical properties as hardness and resistance to water of the resulting hardened product suffer.

In the invention composition the diallyl phthalate polymer resin of at least 40% by weight of diallyl phthalate and not more than 60% by weight of a comonomer copolymerizable therewith is used in an amount of 5–50% based on the total weight of the solids contents of water glass and said resins. By the weight of the resins, as here used, is meant in the case of the emulsion polymerization product liquid the content of the polymeric or copolymeric solids components in the liquid. On the other hand, the solids content of the water glass refers to the total of the analytical values (weight %) of silicon dioxide and alkali metal oxides. When the amount of resins used is less than the above-indicated lower limit, the improvement in the impact strength and flexural resistance of the composition after its hardening is inadequate. Again, not only does the coating properties suffer when it is used as a cating material, but also a phenomenon of bubble formation tends to occur during the hardening of the composition. On the other hand, when the amount used of the resins is too great such that the foregoing upper limit is exceeded, a decline takes place in such properties as flame retardancy, heat resistance, resistance to water and hardness.

In forming the invention composition it is preferred that the several components are mixed together as homogeneously as possible. For accomplishing this, preferably used are such means as a ball mill, attrition mill, vibrating mill, etc. The invention composition can contain such additives as pigments, fillers, dispersing agents, wetting agents, defoaming agents, leveling agents, etc., which can be incorporated, as required, by addition at the time the foregoing mixing is being carried out. As specific examples of these additives, mention can be made of the fillers such as clay, talc, diatomaceous earth, calcium carbonate, alumina and calcium silicate; the pigments such as titanium dioxide, titan yellow, chromium oxide, iron oxide, carbon black, ultramarine, phthalocyanin blue and cadmium red; the wetting agents such as polyoxyethylene alkyl ether and sodium dodecylbenzenesulfonate; the dispersing agents such as carboxymethylcellulose and the condensation products formed between sodium naphthalenesulfonate and formalin; and the defoaming agents such as silicone and polyethylene glycol. These additives are used in amounts equalling the case of the usual water paints. For instance, the fillers are used in an amount of 1–20 parts, the pigments are used in an amount of 0.1–30 parts, and the dispersing agents, wetting agents and defoaming agents are used in amounts of 0.01–2 parts, per 100 parts by weight of the water glass.

The flame retardant hardenable composition of this invention can be made into a hardened product by casting the composition in a suitable mold and hardening by drying. Alternatively, a suitable substrate can be coated or impregnated with the composition and hardened by drying to obtain a hardened product. In this latter case, a decorative product can be obtained by operating in the following manner: i.e., by application in advance to the substrate of a colored design or first coating or impregnating the substrate with the composition followed by predrying the coated or impregnated substrate, then applying a colored design to the surface thereof and thereafter hardening the product.

While the dry-hardening of the composition can be carried out under conditions of normal atmospheric or reduced pressure at room temperature, for shortening the time required for solidification, preferred is the application of heat at normal or reduced pressure. Usually, a temperature of above 120°C., and preferably 150°–300°C., can be employed.

In accordance with one mode of producing a hardened decorative product with the invention composition, a suitable solid substrate is either coated or impregnated with the invention hardenable composition, following which the surface of the substrate can then be printed with the desired color, design or pattern.

As such a substrate, included are such materials as metal sheets, molding of metals, slate, calcium silicate boards, pulp-cement boards, plate glass, synthetic resin sheets, plywood, wood, etc. Instead of applying the invention composition directly to such a substrate, it is also possible to apply the invention composition to materials having a relatively high heat resisting temperature or to paper, synthetic paper, nonwoven fabric, knit or woven fabric and film that have been given a heat-resisting treatment, or to aluminum foil, thin aluminum sheet and thin steel sheet, followed by printing the surface of the so applied material with the desired design and thereafter adhering the so treated material to the foregoing substrate.

In this invention the printing of the surface that has been coated with the hardenable composition can be carried out at any time after the surface has reached a tactually dried state. A predrying of this sort can be carried out at room temperature under normal atmospheric or reduced pressure conditions. However, it is more advantageous from the standpoint of operating time to carry out this predrying by application of heat. Heating temperatures ranging from room temperature to about 150°C. are usually used. For instance, a drying at temperatures of the order of 90°–120°C. is effective. This predrying may also be carried out under conditions in which the escape of water is checked. For instance, after coating or impregnating the material with the invention hardenable composition, the surface of the substrate or material is covered with a synthetic resin film intimately adhered thereto, following which the composition can be solidified in a water-containing state by heating at a temperature not exceeding about 100°C. This mode of operation is a desirable one, since the smoothness of the surface of the substrate or material can be enhanced for facilitating the subsequent printing to be applied. The printing can be carried out even after the surface has completely solidified. For instance, the printing can be carried out even after the surface has been solidified at an elevated temperature of above 120°C., and preferably 150°–300°C. In this case, for improving the water resistance, heat resistance, weatherability and flame retardancy of the printing ink, there are instances where it is desirable to calcine the product again at elevated temperatures after printing, or to apply the invention hardenable composition again after the printing and again calcining the product. The mode wherein the printing is carried out subsequent to the predrying of the coated or impregnated substrate or material, following which the solidification of the composition is carried out by heat treating at above 120°C., and preferably 150°–300°C., is however preferred, since in this case the retention of the printing ink firmly in the coating is facilitated.

While the printing for imparting the decorations such as coloring, a pattern or design can be carried out by the usual methods using the usual printing processes such as the relief, intaglio, lithotype, phototype, offset and photogravure printing processes, in most cases the use of the special printing process is more effective. For instance, when high speed printing is to be carried out, aniline printing is best used. On the other hand, when it is desired to raised the pigment in relief on the printed surface, the silk-screen printing process is preferred; whereas when it is desired to carry out precision multicolor printing by a simple method, the decalcomania process is best used. In the case of the use of decalcomania, the heat transfer type not having an adhesive layer is suitably used. In carrying out this method, the substrate or material is applied the invention hardenable composition followed by immediately pressably adhering the decalcomania to the coated surface of the substrate or material, followed by smoothing with a roller and the submitting the product to predrying and calcination. Thus can be readily obtained a beautiful printed surface. Any printing ink will do, so long as it is a thermally resistant coloring material which does not discolor under the heat-hardening conditions. Usually used is pigment ink. If the time required for the hardening is prolonged, it is also possible to use those coloring materials that can only stand lower temperatures.

In accordance with another mode of producing a hardened decorative product using the invention composition, instead of carrying out printing on the surface of the substrate or material after application of the hardenable composition as in the foregoing mode, the substrate which has already been applied coloring or a pattern or design in advance, is coated or impregnated with the invention composition and then hardened to obtain a decorative product. Further, it is also possible, say, to apply superposedly to the surface of the product obtained in this latter mode a suitable printed pattern executed in accordance with the former mode.

In hardening the hardenable composition in the present invention superatmospheric pressure can be employed, if desired. That is, it is possible to operate in the following manner. A foil or sheet having a decoration is first made by one of the foregoing modes using the invention composition, following which the so made decorative foil or sheet is superposed atop a suitable substrate and hot pressed to obtain a laminated product. In this case, heat-hardening of the product under superatmospheric conditions is a desirable procedure. Again, for further enhancement of the features of the present invention, which resides in providing a complex pattern for the decorative product obtained by using the foregoing printed substrate, it is also possible to add additives for improving the clarity of the patterns. For instance, the concealment of the substrate can be enhanced and the pattern can be made to stand out more clearly by adding about 0.1–5% by weight of the hardenable composition of finely divided silica. Again, the addition to the hardenable composition of a small amount of the same colored pigment as the ink, pigment or coating material that was used with the substrate is also desirable for enhancing the clarity and beauty of the surface of the decorative product.

As hereinbefore described, the invention composition is a unique composition in that notwithstanding the fact that it conjointly possesses flame retardancy, heat resistance, resistance to solvents and other desirable properties of the conventional hardenable composition of water glass, it has effectively overcome the lack of impact strength and flexural strength, the shortcoming of the conventional composition of water glass. Further, it can be used for producing beautiful decorative products which conjointly possess flame retardancy and resistance to flexing and shocks when it is coated to or impregnated into a substrate and hardened. Thus, it is a very valuable composition, which can be used for a wide variety of purposes, such as a material for interior or exterior decorative use, furnitures, etc.

EXAMPLES 1–3 and CONTROL 1

580 Grams of ion-exchanged water, 20 grams of a surfactant of the phosphoric acid ester of polyoxyethylene alkylarylether type (PLYSURF A212C produced by Daiichi Kogyo Seiyaku Co., Ltd., Japan), 1.0 gram of ammonium persulfate, 200 grams of butyl acrylate and 200 grams of orthodiallyl phthalate were charged to a polymerization reactor and polymerized for 8 hours at 80°C. with stirring. The polymerization reaction was completed with no unreacted monomers remaining in the resulting emulsion copolymerization liquid. The dispersoid of this emulsion copolymerization liquid was a copolymeric gel insoluble in benzene and the other solvents and without a melting point. Further, residual allyl groups could not be found by infrared spectrum analysis. On observation with an electron microscope, it was found that the particle size was about 0.075 micron and that the particles were maintained in a stably dispersed state. This emulsion copolymerization liquid was used and compositions were prepared as shown in the following Table 1.

There remained no unreacted isodiallyl phthalate monomer in the so obtained emulsion copolymerization liquid, and it was found as a result of an elementary analysis of the resulting copolymer that the ethylene content was 32% by weight. Further, this copolymer was a gel insoluble in benzene and the other solvents and was without a melting point. Again, no residual ally grups were found on analysis by infrared spectrum analysis. On observation by an electron microscope, the particle size was about 0.1 micron. This emulsion copolymerization liquid (solids content 35%) was used

TABLE 1

|  | Example 1 | Example 2 | Example 3 | Control 1 |
|---|---|---|---|---|
| JIS No. 1 sodium silicate[1] | — | 40gm | — | — |
| JIS No. 3 sodium silicate[2] | 90gm | 30 | 60gm | 100gm |
| Emulsion polymerization liquid | 10 | 30 | 40 | — |
| Condensed aluminum phosphate[3] | 10 | — | 7 | 10 |
| Sodium hexafluorosilicate | — | 10 | — | — |
| Red oxide | — | — | 2 | — |
| Alumina cement | — | — | 2 | — |

Notes.
[1] No. 1 SODIUM SILICATE produced by Nippon Chemical Co., Ltd., Japan, passing JIS K 1408-1966, solids content 55%, $SiO_2/Na_2O$ mol ratio = 2.2.
[2] No. 3 SODIUM SILICATE produced by Nippon Chemical Co., Ltd., Japan, passing JIS K 1408-1966, solids content 40%, $SiO_2/Na_2O$ mol ratio = 3.2.
[3] Prepared in the following manner. An aluminum phosphate of $P_2O_5/Al_2O_3$ mol ratio = 2.6 prepared by dissolving hydrated alumina in an aqueous phosphoric acid solution is calcined by first heating at 380°–400°C. for 3 hours and then at 490°–550°C. for 3 hours followed by comminution in a ball mill to a particle size of not greater than 30 microns.

The foregoing composition was mixed for 10 minutes with stirring, after which it is applied to a degreased mild sheet steel (50 × 150 × 0.5 mm) such as described in JIS K5400-1970. The coated sheet was then immediately predried for 10 minutes at 90°C. in a hot air circulating type constant temperature chamber and thereafter baked for 20 minutes at 200°C. The thickness of the coatings after hardening was 80–90 microns in every instance. The physical property measurements of the hardened coatings are shown in Table 1′, below.

and a composition having the same makeup as that of Example 1 was prepared. The coating (thickness 54 micron) obtained by applying and baking the composition as in Example 1 had a pencil scratch hardness of above 9H, a room temperature water resistance of more than 4 days, and passed the curvature radius of 64 mm in the flexural test.

EXAMPLES 4–9 AND CONTROLS 2 AND 3

Compositions in accordance with the present inven-

Table 1′

| Experiment No. | Pencil hardness 1) | Water resistance (room temperature) 1) | Flexural resistance 2) | Flame retardancy 3) |
|---|---|---|---|---|
| Example 1 | Above 9H | 4 days or more | Passed the curvature radius 64 mm | Passed Flame retardancy Class 1 |
| " 2 | 9H | " | Passed the curvature radius 38 mm | " |
| " 3 | 9H | " | " | " |
| Control 1 | Above 9H | " | Failed to pass the curvature radius 254 mm | " |

Notes.
1) Tested in accordance with JIS Method K 5400-1970.
2) Tested in accordance with JIS Method K 5400-1970, except that iron pipes of varying curvature radii ranging gradationally between 12.7 mm and 254 mm at 12.7 mm curvature radius intervals were used.
3) Tested in accordance with JIS Method A 1321-1970.

EXAMPLE 4

A five-liter autoclave was charged with 2000 grams of ion-exchanged water, 50 grams of a surfactant (PLYSURF A212C), 2.5 grams of ammonium per-sulfate and 500 grams of diallyl isophthalate followed by purging the inside of the autoclave with ethylene gas. The reaction was then carried out for 15 hours at 80°C. by pressuring the system to 60 kg/cm with ethylene gas.

tion were prepared by using the same water glass as that used in Example 1 (JIS No. 3 sodium silicate) with either a diallyl orthophthalate emulsion polymer (solid content 30 weight %) or a diallyl isophthalate-butyl acrylate copolymer emulsion (butyl acrylate content 50 weight %, solids content 30 weight %), and the same hardener as that used in Examples 1–3, and by combining the components as in Table 2.

Table 2

| Composition | Water glass | Polymer | Copolymer | Hardener | |
|---|---|---|---|---|---|
| A | 90gm | 10gm | — | condensed aluminum phosphate | 10 gm |
| B | 70 | — | 30gm | sodium hexafluorosilicate | 10 gm |
| C | 60 | — | 40 | condensed aluminum phosphate | 7 gm |
| D | 100 | — | — | " | 10 gm |

Using sheet glass, sheet slate and sheet aluminum (each 200 × 200 mm in size) as substrate, the compositions of Table 2 were applied severally to these substrates. This was followed by transferring commercially available decalcomanias, using a roller to pressably adhere the decalcomania smoothly to the substrate followed by heating the decalcomania-transferred substrate at ca. 100°C. for several minutes. The so treated substrate was then predried at 90°C., and thereafter the coated and picture-transferred surface was either baked or press-hardened. The combinations of the several substrates and decalcomanias and the baking and pressing conditions are shown in Table 2'.

dizing flame at the tip comes into contact with the decorative surface, the lamp was lighted for a period of 60 seconds and extinguished. The environs of the test apparatus were maintained at 20°–30°C., and screens were placed about the apparatus to ensure that there was no movement of air. The flame retardancy was determined by an examination of the state of ignition, flaming and smoking of the sample. The results of the flame retardancy test that was conducted as above described, the flexural test that was carried out with the decorative surface facing outwardly, and the boiling test are shown in Table 2''.

Table 2''

| Experiment No. | Ignition | Flame retardancy test Flaming | Smoking | Remarks | Flexural test | Boiling test |
|---|---|---|---|---|---|---|
| Example 5 | no | no | no | No change in decorative surface | — | No abnormality |
| " 6 | no | no | no | " | Cracks do not form as a result of flexure. | " |
| " 7 | no | no | no | " | Passed 180° bending on a 3-mm mandrel. | " |
| " 8 | no | no | slight | Slight discoloration | Cracks do not form as a result of flexure. | Slight whitening |
| " 9 | no | no | no | " | Passed 180° bending on a 3-mm mandrel. | No abnormality |
| " 10 | no | no | slight | No change in decorative surface | " | Slight whitening |
| Control 2 | no | no | no | " | Failed to pass a 500-mm diameter flexure. | " |
| " 3 | yes | yes | very great | Carbonization occurred and decorative surface disappeared. | — | — |

Table 2'

| Experiment No. | Composition | Decalcomania | Substrate | Hardening conditions |
|---|---|---|---|---|
| Example 5 | A | paper-based flower design | sheet glass | Baked at 200°C. for 30 minutes. |
| " 6 | B | " | sheet slate | " |
| " 7 | B | paper-based abstract design | sheet aluminum | " |
| " 8 | C | polypropylene-based wood grain design | sheet slate | Baked at 180°C. for 30 minutes. |
| " 9 | C | " | sheet aluminum | Baked at 240°C. for 30 minutes. |
| " 10 | B | " | " | Hot-pressed at 10 kg/cm² pressure at 180°C. for 30 minutes. |
| Control 2 | D | " | " | " |
| " 3 | commercial polyester decorative sheet | | | |

The flame retardancy test of the samples prepared as indicated in Table 2' was conducted in the following manner. The sample sheet of 200 × 200 mm size was held at an incline of 45°, and an alcohol lamp was disposed at a position 25 millimeters below the sample sheet plumb of the center of decorative surface thereof. After adjusting the size of the flame such that the oxi-

EXAMPLES 10–15

Compositions in accordance with the present invention as well as control compositions were prepared by using the same water glass as that used in Example 1 with either a diallyl orthophthalate emulsion polymer or a diallyl isophthalate-butyl acrylate emulsion copolymer (butyl acrylate content 50 weight %, solids content 30 weight %), and the same hardener as that used in Examples 1–3, and by combining the components as in Table 3.

flexural test with the decorative surface facing outwardly, with the results shown in Table 3''.

Table 3''

| Experiment No. | Ignition | Flame retardancy Flaming | Smoking | Remarks | Flexural test |
|---|---|---|---|---|---|
| Example 11 | no | no | no | No change in decorative surface | Cracks are not form as a result of flexure. |
| '' 12 | no | no | no | '' | Passed mandrel bending test (3-mm diameter, 180°C.) |
| '' 13 | no | no | slight | '' | '' |
| '' 14 | no | no | no | '' | '' |
| '' 15 | no | no | slight | slight discoloration | Cracks are not formed as a result of flexure. |
| '' 16 | no | no | no | '' | '' |
| Control 4 | no | no | no | No change in decorative surface | Failed to pass the 500-mm diameter flexural test. |
| '' 5 | yes | yes | very great | Decorative paper carbonized and burned up. | — |

Table 3

| Composition | Water glass | Polymer | Copolymer | Hardener | | Others | |
|---|---|---|---|---|---|---|---|
| A | 90gm | 10gm | — | condensed aluminum phosphate | 10 gm | — | |
| B | 70 | — | 30gm | sodium hexafluorosilicate | 10 gm | — | |
| C | 60 | — | 40 | condensed aluminum phosphate | 7 gm | — | |
| D | 60 | — | 40 | '' | 7 gm | finely divided silica | 1.0 gm |
| E | 100 | — | — | '' | 10 gm | — | |

The foregoing compositions were applied severally to the commercially available polyester nonwoven fabric with an abstract design, pattern paper for melamine use and asbestos paper with wood grain, following which these coated materials were adhered to sheet slate, sheet iron and sheet aluminum having the dimensions of 200 × 200 mm. The resulting assemblies were then predried for 10 minutes at 90°C. and thereafter either baked or press-hardened at 180°–200°C. The combinations of several materials and substrates and the baking or pressing conditions are shown in Table 3'.

Table 3'

| Experiment No. | Composition | Material | Substrate | Hardening conditions |
|---|---|---|---|---|
| Example 11 | A | polyester nonwoven fabric | sheet slate | Baked at 200°C. for 20 minutes. |
| '' 12 | B | '' | sheet iron | Hot-pressed at 10 kg/cm² pressure at 180°C for 30 minutes. |
| '' 13 | C | '' | sheet aluminum | Baked at 180°C. for 30 minutes. |
| '' 14 | D | '' | '' | '' |
| '' 15 | C | pattern paper | sheet slate | '' |
| '' 16 | B | asbestos paper | '' | Baked at 200°C. for 20 minutes. |
| Control 4 | E | polyester nonwoven fabric | sheet iron | '' |
| '' 5 | | commmercial polyester decorative sheet | | |

The samples prepared in the above-described manner were submitted to a flame retardancy test and a

EXAMPLES 17–21 AND CONTROLS 6–10

Preparation of diallyl phthalate type polymer Emulsion copolymer A.

A glass-lined reaction vessel of 120 liter capacity was charged with 70 kg of deionized water, 1570 grams of a phosphoric acid ester of alkylaryl ether type surfactant (PLYSURF A212C), 8 grams of copper sulfate, 5.90 kg of diallyl isophthalate and 1.96 kg of ethyl acrylate, after which the redox polymerization reaction was carried out by heating the system at 70°C. while passing $N_2$ gas therethrough and adding dropwise 160 grams of hydrogen peroxide of 30 weight % concentration during a period of 5 minutes while raising the temperature up to 95°C. in 30 minutes after initiation of the reaction. This was followed by further adding slowly dropwise 17.65 kg of diallyl isophthalate, 5.89 kg of ethyl acrylate and 1410 grams of hydrogen peroxide during a two-hour period, after which the reaction was continued for 5 hours at the temperature obtaining to obtain an emulsion polymerization liquid of polymer A having an average particle size of 1.5 microns. Copolymeric powder B.

A glass-lined reaction vessel of 2-liter capacity was charged with 800 grams of deionized water, 150 grams of diallyl isophthalate, 50 grams of ethyl acrylate, 6 grams of benzoyl peroxide, 2 grams of sodium polyacrylate and 6 grams of sodium sulfate, following which the polymerization reaction was carried out for 7 hours at 80°C. while passing $N_2$ gas through the system to obtain at a yield of about 90% a pearly suspension polymer having a particle size of 1–2 mm.

After washing and drying the so obtained polymer, it was placed in a porcelain vessel of three-sixths-liter capacity along with 2 kg of alumina balls of 15 mm in diameter and 1.5 liters of water and comminuted in a vibrating mill followed by dehydration and drying to obtain a polymeric powder having a particle size of 5–30 microns. Copolymeric powder C.

The polymerization and comminution were carried out as in the case of the foregoing polymer B, except that styrene monomer was used instead of ethyl acrylate, to obtain a copolymeric powder having a particle size averaging 5–35 microns.

Preparation and application of the water glass type compositions

The foregoing copolymers A–C, a commercially available aqueous emulsion for paint use and the several classes of water glasses were used, and the water glass type compositions of the makeups shown in Table 4 were prepared. One kg of each of these compositions and 2 kg of alumina balls of 15 mm in diameter were placed in a porcelain vessel of three-sixths-liter capacity and mixed for 10 minutes in a vibrating mill, after which the composition was applied with a bar coater to a sheet aluminum and a cold rolled sheet steel to a thickness such as to have a coating thickness of 40–45 microns on hardening. The coated samples were then dried for one minute at 120°C. with an air drier and thereafter hardened for 30 minutes at 250°C. The physical properties of the coatings are shown in Table 4'.

The dimensions of the sheet aluminum and cold rolled sheet steel used as the substrate in this case were 0.5 × 50 × 150 mm. Before their use, they were treated in accordance with the JIS Method K 5400-1970.

Table 4

| Experiment No. | Example 17 | Example 18 | Example 19 | Control 6 | Control 7 | Example 20 | Control 8 | Example 21 | Control 9 | Control 10 |
|---|---|---|---|---|---|---|---|---|---|---|
| | wt pts | wt pts | wt pts | wt pts | wt pts | wt pts | wt pts | wt pts | wt pts | wt pts |
| JIS No. 3 sodium silicate[1] | 100 | 100 | — | 100 | 100 | 50 | 50 | 80 | 50 | 50 |
| Potassium silicate[2] | — | — | 100 | — | — | 66 | 66 | — | 66 | 66 |
| Lithium silicate[3] | — | — | 40 | — | — | — | — | 35 | — | — |
| Emulsion copolymer A | 20 | — | — | — | — | 10 | — | 40 | 3 | 100 |
| Copolymeric powder B | — | 6 | — | — | — | — | — | — | — | — |
| "C | — | — | 6 | — | — | — | — | — | — | — |
| Commercial emulsion D[4] | — | — | — | 12 | — | — | — | — | — | — |
| "E[5] | — | — | — | — | 12 | — | — | — | — | — |
| Hardener[6] | 13 | 13 | 13 | 13 | 13 | 13 | 13 | 13 | 13 | 13 |
| Titanium dioxide[7] | 10 | 10 | 10 | 10 | 10 | 10 | 10 | 10 | 10 | 10 |
| Kaolin clay for paint use[8] | 10 | 10 | 10 | 10 | 10 | 10 | 10 | 10 | 10 | 10 |
| Surfactant[9] | — | 0.3 | 0.3 | 0.3 | 0.3 | — | 0.15 | — | 0.15 | — |
| Deionized water | 26 | 40 | — | 34 | 34 | 17 | 24 | 5 | 22 | — |

Notes.
[1]No. 3 SODIUM SILICATE produced by Nippon Chemical Co., Ltd., Japan, passing JIS K 1408–1966, solids content 40 weight %, $SiO_2/Na_2O$ mol ratio = 3.2.
[2]2K POTASSIUM SILICATE produced by Nippon Chemical Co., Ltd., solids content 30 weight %, $SiO_2/K_2O$ mol ratio = 3.5.
[3]LITHIUM SILICATE 35 produced by Nissan Chemical Co., Ltd., Japan, solids content 23 weight %, $SiO_2/Li_2O$ mol ratio = 3.5.
[4]Aqueous emulsion for paint use, a styrene-acrylic acid ester copolymer resin MOWINYL DM 60 produced by Hoechst Gosei Company (Japan), solids content 50 weight %, particle size 0.1 – 0.2 micron, pH 7 – 9.
[5]Aqueous emulsion for paint use, a vinyl acetate resin MOWINYL 300 produced by Hoechst Gosei Company (Japan), solids content 53 weight %, particle size 0.5 – 1.0 micron, pH 4 – 6.
[6]Same as that used in Example 1, i.e., condensed aluminum phosphate comminuted to a particle size 30 microns or smaller.
[7]Rutile type titanium dioxide TIPAQUE R-820 produced by Ishihara Sangyo Co., Ltd, Japan.
[8]Calcined kaolin clay SATINTONE No. 1 produced by Engelhard Minerals & Chemical Corp., U.S.A.
[9]Same as that used in Example 1, i.e., PLYSURF A212C, a surfactant, produced by Daiichi Kogyo Seiyaku Co., Ltd.

Table 4'

| Experiment No. | | State of coating surface | Pencil hardness 1) | Flexural resistance 2) | | Resistance to boiling water 1) | Pencil hardness test after resistance-to-boiling water test 3) |
|---|---|---|---|---|---|---|---|
| Example | 17 | Satisfactory | Above 9H | Passed | 10 mm | No abnormality | Above 9H |
| " | 18 | Somewhat less luster but otherwise satisfactory | " | " | 15 mm | " | " |
| " | 19 | " | " | " | 20 mm | " | " |
| Control | 6 | Numerous grains of 1 - 2 mm diameter; no luster at all | " | " | 35 mm | Peeling occurred locally | Less than 4B |
| " | 7 | " | " | " | 30 mm | Peeling occurred over whole surface | — |
| Example | 20 | Satisfactory | " | 50 mm | Slight swelling | Above 9H | |
| Control | 8 | Numerous swelled portions of about 1.0 mm diameter over whole surface | Measurement impossible | — | | — | — |
| Example | 21 | Somewhat less luster but otherwise satisfactory | Above 9H | Passed | 2 mm | Peeling occurred locally | B |
| Control | 9 | Numerous swelled portions of about | Measurement | | | | |

Table 4'-continued

| Experiment No. | | State of coating surface | Pencil hardness 1) | Flexural resistance 2) | | Resistance to boiling water 1) | Pencil hardness test after resistance-to-boiling water test 3) |
|---|---|---|---|---|---|---|---|
| " | 10 | 1.0 mm diameter over whole surface No luster; surface presented a frosty appearance | impossible 5H | Passed | 2 mm | Major portion peeled | Measurement impossible |

Notes.
1) Conducted in accordance with the JIS Method K 5400-1970.
2) The test was carried out in accordance with the JIS Method K 5400-1970. In the case of mandrels of the flexural resistance tester having a diameter of 10 mm or above, mandrels of SUS 27 having diameters varying gradationally between 15 mm and 50 mm at 5-mm intervals were used.
3) The coating after the resistance-to-boiling water test was measured in accordance with the JIS Method K 5400-1970.

We claim:
1. A flame retardant hardenable composition comprising water glass and a hardener therefor, said composition being incorporated with a resin consisting of a polymer of at least 40% by weight of a diallyl phthalate and not more than 60% by weight of comonomers copolymerized therewith, said resin being incorporated in the composition in an amount of 5–50% based on the total weight of the solids content of said water glass and said resin.

2. A composition of claim 1 wherein said resin is a resinous liquid obtained by emulsion polymerization.

3. A composition of claim 1 wherein said copolymerizable comonomer is a member selected from the group consisting of acrylic acid, $C_1$–$C_8$ alkyl esters of acrylic acid, allyl esters of acrylic acid, glycidyl esters of acrylic acid, 2-hydroxyethyl ester of acrylic acid, phenyl ester of acrylic acid, benzyl ester of acrylic acid, methacrylic acid $C_1$–$C_8$ alkyl esters of methacrylic acid, allyl esters of methacrylic acid, glycidyl esters of methacrylic acid, 2-hydroxyethyl ester of methacrylic acid, phenyl ester of methacrylic acid, benzyl ester of methacrylic acid, allyl esters of cyanuric acid, allyl esters of isocyanuric acid, vinyl esters of $C_1$–$C_{18}$ aliphatic monocarboxylic acids, allyl esters of $C_1$–$C_{18}$ aliphatic monocarboxylic acids, vinyl esters of $C_2$–$C_{10}$ aliphatic dicarboxylic acids, allyl esters of $C_2$–$C_{10}$ aliphatic dicarboxylic acids, allyl esters of benzoic acid, allyl esters of trimellitic acid, allyl esters of pyromellitic acid, allyl esters of naphthalenedicarboxylic acid, $C_1$–$C_8$ alkyl esters of $C_4$–$C_8$ unsaturated dicarboxylic acids, allyl esters of $C_4$–$C_8$ unsaturated dicarboxylic acids, allyl esters of chlorendic acid, allyl esters of tetrahydrophthalic acid, glycidyl allyl ethers, allyl ethers of $C_2$–$C_{10}$ aliphatic polyhydric alcohols, diethylene glycol bis(allylcarbonate), acrylonitrile, acrylamide, styrene, divinylbenzene, vinyl chloride, vinylidene chloride, $C_2$–$C_6$ olefins, methyl vinyl ether, tetraethylene glycol dimethacrylate and N-vinylpyrrolidone.

4. A composition of claim 1 wherein said hardener is a member selected from the group consisting of metallic zinc, metal phosphates, condensed metal phosphates, alkali metal salts of hexafluorosilicic acid and alkaline earth metal salts of hexafluorosilicic acid.

5. A composition of claim 1 wherein said hardener is used in an amount ranging between 10% and 100% by weight based on the solids content of said water glass.

6. A composition of claim 1 wherein said diallyl phthalate polymer is a polymer of a member selected from the group consisting of diallyl orthophthalate, diallyl isophthalate, diallyl terephthalate and mixtures thereof.

7. The composition of claim 1 wherein said resin comprises a polymer having above 90% by weight of diallyl phthalate.

* * * * *